United States Patent
Langlois et al.

(10) Patent No.: US 10,432,013 B2
(45) Date of Patent: Oct. 1, 2019

(54) WINDSHIELD SOLAR MOUNT ASSEMBLY

(71) Applicant: OTTER PRODUCTS, LLC, Fort Collins, CO (US)

(72) Inventors: Christopher R. Langlois, Fort Collins, CO (US); Dane A. Sprister, Fort Collins, CO (US); Zachariah J. Pickett, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 703 days.

(21) Appl. No.: 15/092,312

(22) Filed: Apr. 6, 2016

(65) Prior Publication Data

US 2017/0294803 A1    Oct. 12, 2017

(51) Int. Cl.
| | |
|---|---|
| *H02J 7/35* | (2006.01) |
| *H02S 20/30* | (2014.01) |
| *H02S 10/40* | (2014.01) |
| *H02J 7/00* | (2006.01) |

(52) U.S. Cl.
CPC .............. *H02J 7/355* (2013.01); *H02S 10/40* (2014.12); *H02S 20/30* (2014.12); *H02J 7/0054* (2013.01)

(58) Field of Classification Search
USPC ........................................................ 320/101
See application file for complete search history.

(56) References Cited

U.S. PATENT DOCUMENTS

| | | |
|---|---|---|
| 4,312,580 A | 1/1982 | Schwomma et al. |
| 4,327,316 A * | 4/1982 | Fujikubo ............ B60L 1/00 |
| | | 136/246 |
| 4,413,221 A | 11/1983 | Benjamin et al. |
| 4,957,205 A | 9/1990 | Rose |
| 5,140,310 A | 8/1992 | DeLuca et al. |
| 5,311,112 A | 5/1994 | Creaco et al. |
| 5,325,040 A | 6/1994 | Bogut et al. |
| 5,541,813 A | 7/1996 | Satoh et al. |
| 5,583,742 A | 12/1996 | Noda et al. |
| 5,669,004 A | 9/1997 | Sellers |
| 5,681,122 A | 10/1997 | Burke |
| 5,933,812 A | 8/1999 | Meyer et al. |
| 6,005,368 A | 12/1999 | Frame |

(Continued)

FOREIGN PATENT DOCUMENTS

| | | |
|---|---|---|
| WO | 1994000037 A1 | 1/1994 |
| WO | 1999041958 A1 | 8/1999 |
| WO | 2012074151 A1 | 6/2012 |

*Primary Examiner* — Eric D Lee

(57) ABSTRACT

A solar charging system for a portable electronic device includes an electrical connector adapted to be removably coupled to an electrical interface of the portable electronic device. A rechargeable battery is electrically coupled to the electrical connector, and the rechargeable battery is adapted to store a stored electrical power. A solar panel is electrically coupled to the rechargeable battery such that the received electrical power is stored in the rechargeable battery as stored electrical power. When the electrical connector is electrically coupled to the electrical interface of the installed portable electronic device, stored electrical power is provided or conveyed to the portable electronic device. When the electrical connector is not electrically coupled to the electrical interface of the installed portable electronic device, the received electrical power is stored in the rechargeable battery as stored electrical power.

18 Claims, 13 Drawing Sheets

(56) References Cited

U.S. PATENT DOCUMENTS

| | | | |
|---|---|---|---|
| 6,043,626 A | 3/2000 | Snyder et al. |
| 6,058,356 A | 5/2000 | Swanson et al. |
| 6,129,321 A | 10/2000 | Minelli et al. |
| 6,169,384 B1 | 1/2001 | Shannon |
| 6,184,654 B1 | 2/2001 | Bachner et al. |
| 6,304,459 B1 | 10/2001 | Toyosato et al. |
| 6,317,313 B1 | 11/2001 | Mosgrove et al. |
| 6,356,058 B1 | 3/2002 | Maio et al. |
| 6,388,877 B1 | 5/2002 | Canova et al. |
| 6,405,049 B2 | 6/2002 | Herrod et al. |
| 6,456,487 B1 | 9/2002 | Hetterick |
| 6,504,710 B2 | 1/2003 | Sutton et al. |
| 6,532,152 B1 | 3/2003 | White et al. |
| 6,538,413 B1 | 3/2003 | Beard et al. |
| 6,944,782 B2 | 9/2005 | Mueller et al. |
| 7,116,079 B2 | 10/2006 | Bayne et al. |
| 7,312,984 B2 | 12/2007 | Richardson et al. |
| 7,318,521 B2 | 1/2008 | Lau |
| 7,359,184 B2 | 4/2008 | Lord |
| 7,400,917 B2 | 7/2008 | Wood et al. |
| 7,403,613 B2 | 7/2008 | Liou |
| 7,612,997 B1 | 11/2009 | Diebel et al. |
| 7,782,610 B2 | 8/2010 | Diebel et al. |
| 7,888,629 B2 | 2/2011 | Heslin et al. |
| 7,889,498 B2 | 2/2011 | Diebel et al. |
| 8,013,572 B2 | 9/2011 | Rodgers |
| 8,041,029 B2 | 10/2011 | Wiegers |
| 8,286,013 B2 | 10/2012 | Chen et al. |
| 8,344,293 B1 * | 1/2013 | McCabe | H05B 1/0227 219/482 |
| 8,367,235 B2 | 2/2013 | Huang |
| 8,690,600 B1 | 4/2014 | Zeolla |
| 8,727,192 B2 | 5/2014 | Lai |
| 8,907,752 B2 | 12/2014 | Wodrich et al. |
| 9,048,665 B2 | 6/2015 | Wojcik et al. |
| 9,698,632 B2 | 7/2017 | Davison et al. |
| 9,774,192 B2 | 9/2017 | Wojcik et al. |
| 10,008,870 B2 | 6/2018 | Davison et al. |
| 10,164,468 B2 | 12/2018 | Fitzgerald et al. |
| 2002/0075003 A1 | 6/2002 | Fridman et al. |
| 2005/0189913 A1 | 9/2005 | Vitanov et al. |
| 2005/0224508 A1 | 10/2005 | Tajiri et al. |
| 2005/0279661 A1 | 12/2005 | Hodges |
| 2006/0244422 A1 | 11/2006 | DiGiovanna et al. |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0138920 A1 | 6/2007 | Austin et al. |
| 2007/0146985 A1 | 6/2007 | Mick et al. |
| 2007/0158220 A1 | 7/2007 | Cleereman et al. |
| 2007/0226527 A1 | 9/2007 | Ang |
| 2008/0011917 A1 | 1/2008 | Adams |
| 2008/0269724 A1 | 10/2008 | Sarkinen et al. |
| 2008/0272741 A1 | 11/2008 | Kanamori |
| 2008/0316687 A1 | 12/2008 | Richardson et al. |
| 2009/0017884 A1 | 1/2009 | Rotschild |
| 2009/0037284 A1 | 2/2009 | Lewis et al. |
| 2009/0106567 A1 | 4/2009 | Baarman |
| 2009/0115369 A1 | 5/2009 | Lin et al. |
| 2009/0186264 A1 | 7/2009 | Huang |
| 2010/0093412 A1 | 4/2010 | Serra et al. |
| 2010/0124040 A1 | 5/2010 | Diebel et al. |
| 2010/0156344 A1 | 6/2010 | Inoue et al. |
| 2010/0270970 A1 | 10/2010 | Toya et al. |
| 2010/0317413 A1 * | 12/2010 | Tan | H02J 7/0044 455/573 |
| 2010/0323616 A1 | 12/2010 | Novak et al. |
| 2011/0159324 A1 | 6/2011 | Huang et al. |
| 2011/0163714 A1 | 7/2011 | Ettes et al. |
| 2011/0260681 A1 | 10/2011 | Guccione et al. |
| 2012/0028691 A1 | 2/2012 | Koehl |
| 2012/0106037 A1 | 5/2012 | Diebel et al. |
| 2012/0178505 A1 | 7/2012 | Yang et al. |
| 2012/0235792 A1 | 9/2012 | Huang et al. |
| 2012/0306431 A1 | 12/2012 | Li et al. |
| 2012/0314354 A1 | 12/2012 | Rayner |
| 2013/0119922 A1 | 5/2013 | Chen et al. |
| 2013/0206844 A1 | 8/2013 | Chen et al. |
| 2013/0214730 A1 | 8/2013 | Lu et al. |
| 2013/0220841 A1 | 8/2013 | Yang |
| 2013/0262248 A1 | 10/2013 | Kim et al. |
| 2014/0065948 A1 | 3/2014 | Huang |
| 2014/0091758 A1 | 4/2014 | Hidaka et al. |
| 2014/0191033 A1 | 7/2014 | Wojcik et al. |
| 2014/0191724 A1 | 7/2014 | Wojcik et al. |
| 2014/0253024 A1 | 9/2014 | Rautiainen et al. |
| 2014/0306654 A1 | 10/2014 | Partovi |
| 2015/0270734 A1 | 9/2015 | Davison et al. |
| 2015/0362824 A1 * | 12/2015 | Cunningham, III | F16M 13/04 396/423 |
| 2016/0079793 A1 | 3/2016 | Cho et al. |
| 2016/0173667 A1 * | 6/2016 | Torres Gutierrez | H04M 1/04 455/575.1 |
| 2016/0294427 A1 | 10/2016 | Wojcik |

* cited by examiner

WINDSHIELD SOLAR MOUNT ASSEMBLY

FIELD OF THE DISCLOSURE

This disclosure relates generally to a charging system for a portable electronic device, and more particularly to a charging system that uses ambient light to supply power to the portable electronic device.

BACKGROUND

Portable electronic devices (such as smartphones or navigational devices, for example) are frequently used in vehicles to entertain or provide assistance to a driver and/or passenger. For example, if a vehicle's radio is not capable of connecting to a cellular or other wireless network, a portable electronic device that can connect to such a network may be connected to the vehicle's existing speakers (via a hard wire or wirelessly using a BLUETOOTH® connection) to stream music in the vehicle. As another example, a portable electronic device may be used to run a navigation application to provide turn-by-turn directions to a destination.

While convenient for the user and passenger, applications such as these can quickly drain the portable electronic device's battery, thus leaving the user or passenger with a choice of terminating the application or risk losing all power in the portable electronic device. To prevent such battery depletion, charging adapters may be used with a mounting assembly that secures the portable electronic device in a desired location in the vehicle (for example, mounted to the vehicle's windshield). However, typical charging adapters rely on cables that extend from the portable electronic device to a portion of the vehicle's dashboard, such as the vehicle's lighter adapter. These cables can prevent the vehicle's driver from viewing instruments or gauges, thereby distracting the driver and endangering the lives of the driver and any passengers. Such cables can also clutter the interior of the vehicle and prevent the driver from accessing features, such as the radio or air conditioning controls. Accordingly, there is a need for a charging system that allows for convenient access and use of a portable electronic device within a vehicle without the clutter and potential for dangerous interference associated with known recharging cables.

BRIEF SUMMARY OF THE DISCLOSURE

A solar charging system for a portable electronic device including an electrical interface includes a protective case for receiving and partially enclosing the portable electronic device when the portable electronic device is installed in the protective case. The solar charging system also includes a charging assembly including an electrical connector adapted to be removably coupled to the electrical interface of the portable electronic device such that when the electrical connector is coupled to the electrical interface of the portable electronic device, the electrical connector is electrically coupled to the electrical interface of the portable electronic device. The charging assembly also includes a rechargeable battery electrically coupled to the electrical connector, and the rechargeable battery is adapted to store a stored electrical power. The charging assembly also includes a mounting interface to which the protective case can be removably mounted, the mounting interface and the protective case configured such that the electrical connector electrically coupled to the rechargeable battery engages the electrical interface of the installed portable electronic device when the protective case is mounted or coupled to the mounting interface. The charging assembly further includes a solar panel configured for receiving ambient light and converting the ambient light to received electrical power. The solar panel is electrically coupled to the rechargeable battery such that the received electrical power is configured to be stored in the rechargeable battery as stored electrical power. When the protective case is mounted to the mounting interface, the electrical connector is electrically coupled to the electrical interface of the installed portable electronic device such that the stored electrical power is provided or conveyed to the portable electronic device. When the protective case is not mounted to the mounting interface, the received electrical power is stored in the rechargeable battery as the stored electrical power.

DETAILED DESCRIPTION OF THE INVENTION

The solar charging system of the present invention solves the problems of known charging adapters by charging the portable electronic device while it is used as a navigational tool or as a streaming radio while at the same time minimizing the number of wires that can distract the driver of the vehicle or prevent the driver from seeing a portion of the instrument panel or accessing features in the vehicle. More specifically, one or more solar panels may be incorporated into the solar charging system so that ambient light may provide power to the portable electronic device. The solar panel(s) eliminate the need for wires to extend between the portable electronic device and the vehicle's dashboard, thereby allowing the vehicle's driver to see and access the entire dashboard. The solar panel(s) also may be connected to a rechargeable battery, and the solar panel(s) may charge the rechargeable battery during daylight hours to maintain a full charge in the rechargeable battery. Such a fully charged battery increases the charge rate of the portable electronic device relative to a solar panel alone. In addition, the portable electronic device may be electrically connected to the rechargeable battery to provide power when no or little ambient light is available.

Figure 1:
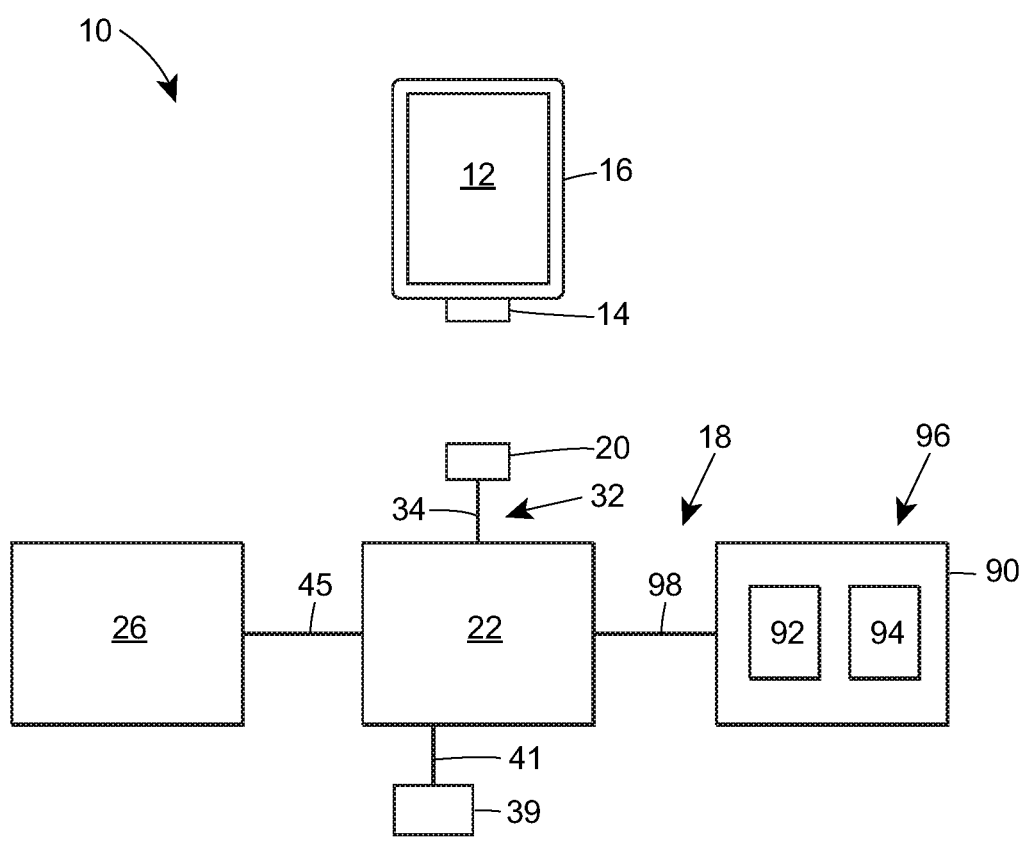
FIG. 1 is a schematic view of an embodiment of a solar charging system.

FIG. 1 schematically illustrates an embodiment of a solar charging system 10 provided for a portable electronic device 12 that includes an electrical interface 14. The solar charging system 10 includes a protective case 16 for receiving and partially (or at least partially) enclosing the portable electronic device 12 when the portable electronic device 12 is installed in the protective case 16. The solar charging system 10 also includes a charging assembly 18 including an electrical connector 20 adapted to be removably coupled to the electrical interface 14 of the portable electronic device 12 such that when the electrical connector 20 is coupled to, connected to, or mated with the electrical interface 14 of the portable electronic device 12, the electrical connector 20 is electrically coupled to the electrical interface 14 of the portable electronic device 12. The charging assembly 18 also includes a rechargeable battery 22 electrically coupled to the electrical connector 20, and the rechargeable battery 22 is adapted to store a stored electrical power.

As illustrated in FIGS. 2 and 12 to 15, the charging assembly 18 also includes a mounting interface 24 to which the protective case 16 can be removably mounted. The mounting interface 24 and the protective case 16 are configured such that the electrical connector 20 electrically coupled to the rechargeable battery 22 engages the electrical interface 14 of the installed portable electronic device 12 when the protective case 16 is mounted to the mounting interface 24. Referring to FIG. 1, the charging assembly 18 further includes a solar panel 26 configured for receiving ambient light and converting the ambient light to received electrical power. The solar panel 26 is electrically coupled to the rechargeable battery 22 such that the received electrical power is configured to be stored in the rechargeable battery 22 as stored electrical power (or as a portion of the stored electrical power). When the protective case 16 is mounted to the mounting interface 24, the electrical connector 20 is electrically coupled to the electrical interface 14 of the installed portable electronic device 12 such that the stored electrical power (or at least a portion of the stored electrical power) is provided or conveyed to the portable electronic device 12. When the protective case 16 is not mounted to the mounting interface 24, the received electrical power is stored in the rechargeable battery as the stored electrical power (or as a portion of the stored electrical power). Received electrical power may also be stored in the rechargeable battery 22 as the stored electrical power (or as a portion of the stored electrical power) when the protective case 16 is mounted to the mounting interface 24 (or when the electrical connector 20 is electrically coupled to the electrical interface 14 of the portable electronic device 12) when an internal battery (not shown) of the portable electronic device 12 is fully charged or when a charging level of the internal battery of the portable electronic device 12 is greater than or equal to a threshold stored charge (e.g., 80% charged, 90% charged, 100% charged).

Figure 3:
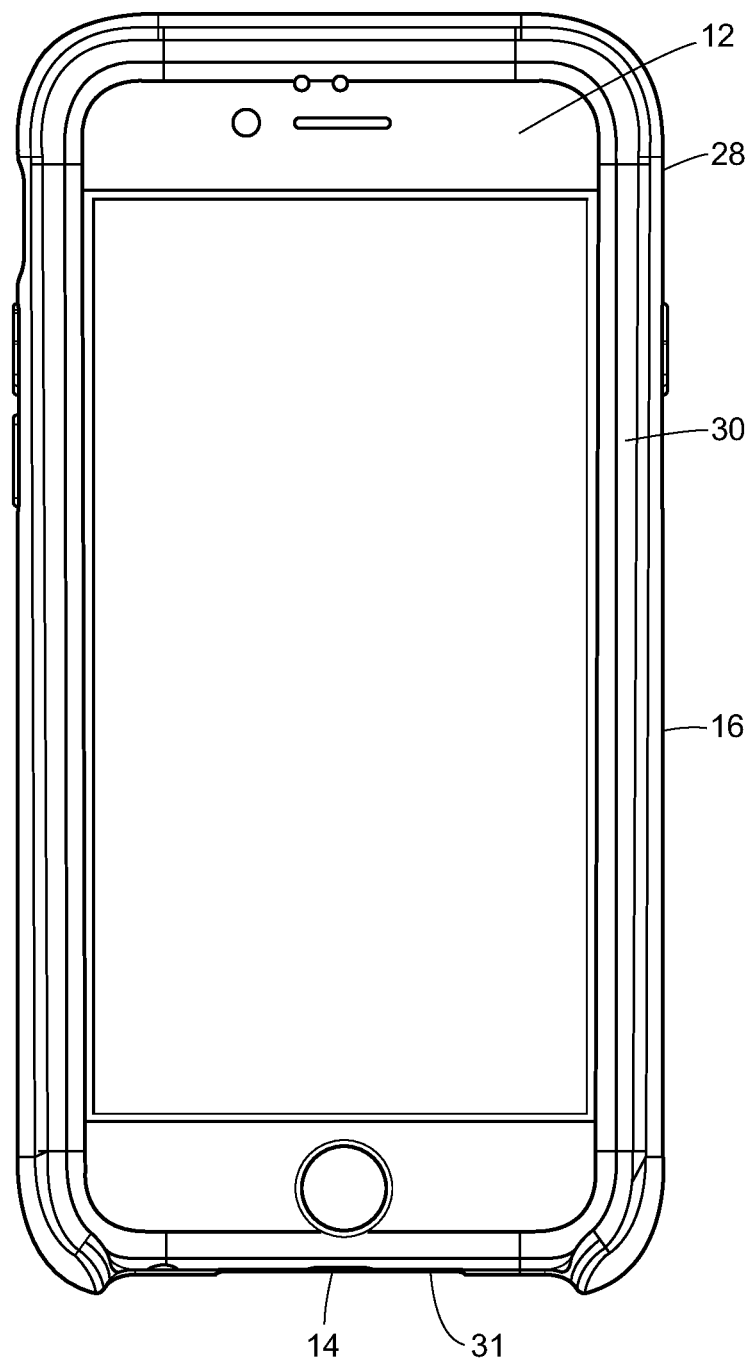
FIG. 3 is a front view of an embodiment of a protective case enclosing a portable electronic device.
Figure 4:
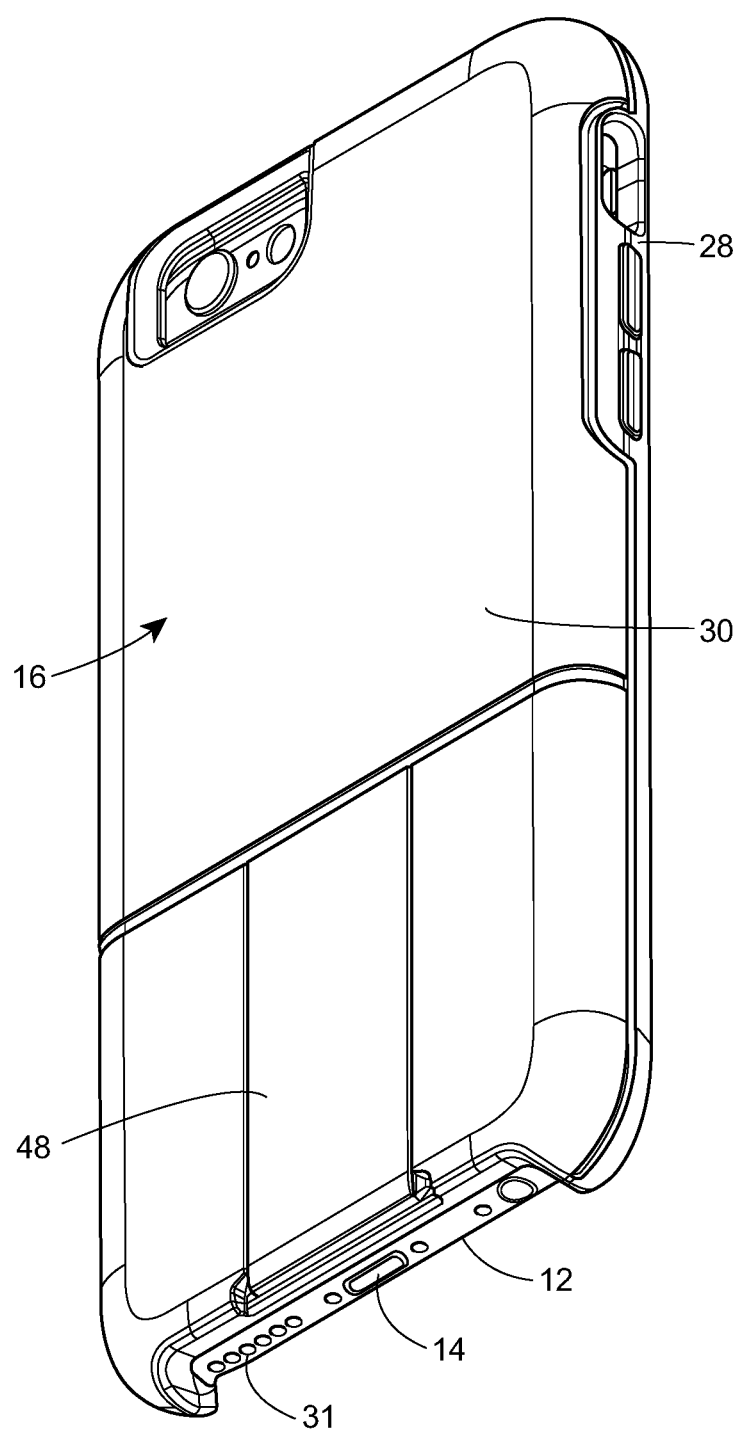
FIG. 4 is a rear view of the embodiment of the protective case illustrated in FIG. 3.

Turning to the solar charging system 10 in more detail, the protective case 16 for receiving and partially enclosing the portable electronic device 12 may be any suitable case that at least partially surrounds the portable electronic device 12 to provide at least some protection for the portable electronic device 12 while allowing access to the electrical interface 14. For example, as illustrated in FIGS. 3 and 4, the protective case 16 for the portable electronic device 12 may include an inner liner 28 and an outer shell 30. The inner liner 28 may act as a cushion layer and may provide the primary surface(s) for receiving and holding the portable electronic device 12 in the protective case 16. The inner liner 28 may contact the portable electronic device 12 on any one or more of a back surface, on one or more side surfaces, and/or on a portion of a front surface of the portable electronic device 12. The inner liner 28 may be configured to cushion an installed electronic device from external forces, impacts, sudden acceleration, sudden deceleration, and other forces experienced at outer surfaces of the protective case 16. Further, the inner liner 28 may be made of a material that is pliant to allow it to flexibly hold the portable electronic device 12 to reduce movement, shifting, or rattling of the portable electronic device 12 within protective case 16. The inner liner 28 may be made of any suitable material that allows for such protection and flexibility, and the inner liner 28 typically comprises a material that is softer than a material of the outer shell 30. In some embodiments, the inner liner 28 may be made of an elastomer, such as a thermoplastic elastomer or silicone rubber.

The outer shell 30 may also be referred to as a structural layer, a frame, a rigid layer, a bottom shell, and/or a shell of the protective case 16. The outer shell 30 may extend around some or all of the outer surface of inner liner 28. The outer shell 30 may be manufactured from a material that is harder, more rigid, stiffer, more puncture resistant, more crush resistant, more chemical resistant, and/or more abrasion resistant than the material of inner liner 28. The material of outer shell 30 may be any suitable material, such as a thermoplastic polymer or a synthetic polymer, and the material may include polycarbonate, nylon, or glass filled nylon.

The protective case 16 may include an aperture 31 that at least partially surrounds the electrical interface 14 of the portable electronic device 12 when the portable electronic device 12 is disposed in the protective case 16 such that a user has access to the electrical interface 14 of the portable electronic device 12. In some embodiments (not pictured), the aperture 31 may be selectively covered by a removable door, latch, or plug to prevent debris from entering the electrical interface 14 when the portable electronic device 12 is in use. The electrical interface 14 of the portable electronic device 12 may be for transmitting and/or receiving electrical data communication signals to/from the portable electronic device 12. The electrical interface 14 may also be for supplying electrical power to and/or receiving electrical power from the portable electronic device 12. The electrical interface 14 may include or may be configured to mate with a standardized electrical plug or connector such as, for example, a USB connector, a mini USB connector, a micro USB connector, an APPLE LIGHTNING® connector, a proprietary electronic connector, and/or an electrical connector of another type.

As illustrated in FIG. 1, the solar charging system 10 also includes the charging assembly 18, which includes the electrical connector 20, the rechargeable battery 22, and the solar panel 26. The electrical connector 20 may be any connection or combination of connections that electrically engages, couples to, and/or mates with the electrical interface 14 of the portable electronic device 12 to allow a device (such as the rechargeable battery 22) electrically coupled to the electrical connector 20 to communicate with the portable electronic device 12. For example, the electrical connector 20 may be electrically coupled to the rechargeable battery 22 and may allow the rechargeable battery 22 to transfer electrical power from the rechargeable battery 22 to the portable electronic device 12 when the electrical connector 20 is coupled to the electrical interface 14 of the portable electronic device 12. The electrical connector 20 may also allow a device (such as the rechargeable battery 22) electrically coupled to the electrical interface 14 of the portable electronic device 12 to communicate with the portable electronic device 12 (e.g., to transmit and/or receive electrical data communication signals to/from the portable electronic device 12). Like the electrical interface 14, the electrical connector 20 may include or may be configured to mate with a standardized electrical plug or connector such as, for example, a USB connector, a mini USB connector, a micro USB connector, an APPLE LIGHTNING® connector, a proprietary electronic connector, and/or an electrical connector of another type.

The charging assembly 18 also includes the rechargeable battery 22 electrically coupled to the electrical connector 20. The rechargeable battery 22 may be directly or indirectly electrically coupled to the electrical connector 20 in any suitable manner. For example, the rechargeable battery 22 may be electrically coupled to the electrical connector 20 by circuitry 32 (or a portion of the circuitry 32), which may include one or more wires 34. The rechargeable battery 22 may be any type of electrical battery that can be charged, discharged into a load, and/or recharged multiple times. The rechargeable battery 22 may also be any battery that can store or accumulate a stored electrical charge or energy (i.e., stored electrical power) that may be capable of providing power to the portable electronic device 12 (or to the internal battery of the portable electronic device 12) when the electrical interface 14 of the portable electronic device 12 is coupled to or mated with the electrical connector 20. The rechargeable battery 22 may have any suitable charge/discharge range, such as a range between about 20% and about 80% charge. In other words, the rechargeable battery 22 may be used most efficiently and/or effectively if it is typically not charged above about 80% capacity and typically not discharged below about 20% capacity.

The rechargeable battery 22 may include one or more: rechargeable batteries, fuel cells, capacitors, supercapacitors, alkaline batteries, carbon-zinc batteries, nickel-metal hydride batteries, lithium batteries, lithium ion batteries, lithium titanate cells, and/or lithium polymer batteries. The rechargeable battery 22 may be a single device or may be a plurality of devices. The rechargeable battery 22 may have any suitable internal or external charging circuitry (not shown), and the charging circuitry may include a device or group of devices for monitoring a condition of the rechargeable battery 22 (and/or the portable electronic device 12) and/or controlling the amount of charging current delivered to the rechargeable battery 22 (and/or or to the portable electronic device 12). The charging circuitry may (or may not) be electrically coupled to the circuitry 32 (or a portion of the circuitry 32). In addition, the charging circuitry may be electrically coupled to a computing device 90 including a memory 92 and a processor 94 (illustrated in FIG. 1), and the computing device 90 may be coupled to or integrated with any portion(s) of the charging assembly 18, such as the solar panel 26 and/or the rechargeable battery 22.

Figure 2:
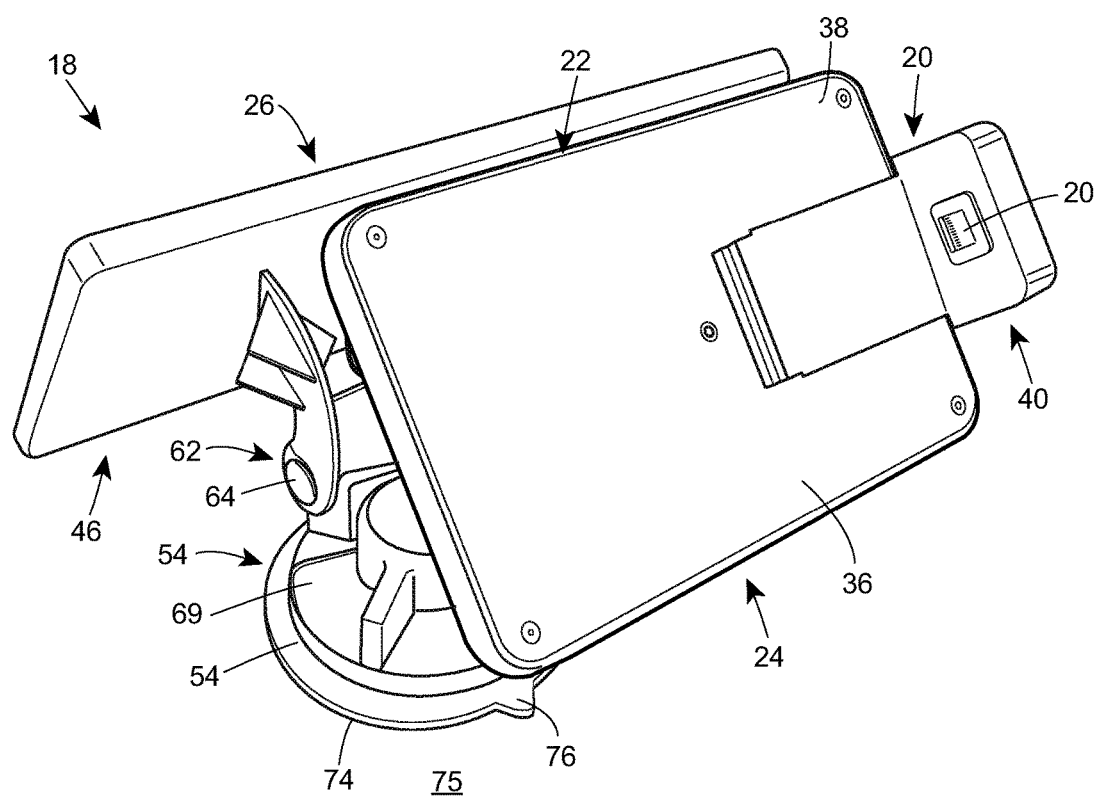
FIG. 2 is a perspective view of an embodiment of a charging assembly of an embodiment of a solar charging system.

Referring to FIGS. 2, 5 to 7, and 12 to 15, the charging assembly 18 also includes a mounting interface 24 to which the protective case 16 can be removably supported, coupled, or mounted. In some embodiments, the mounting interface 24 may also support the rechargeable battery 22. As illustrated in FIG. 2, the mounting interface 24 may include a support portion 36 that may generally correspond in shape and size to the protective case 16 of the portable electronic device 12. The support portion 36 may have a top surface 38 that may be planar or substantially planar, and the top surface 38 may be adjacent to or in contact with a back surface of the protective case 16 (or of the portable electronic device 12) when the portable electronic device 12 is coupled to the support portion 36. The rechargeable battery 22 may comprise all or a portion of the support portion 36. For example, a frame may at least partially surround the rechargeable battery 22, and the frame and the rechargeable battery 22 may cooperate to form at least a portion of the support portion 36.

Figure 6:
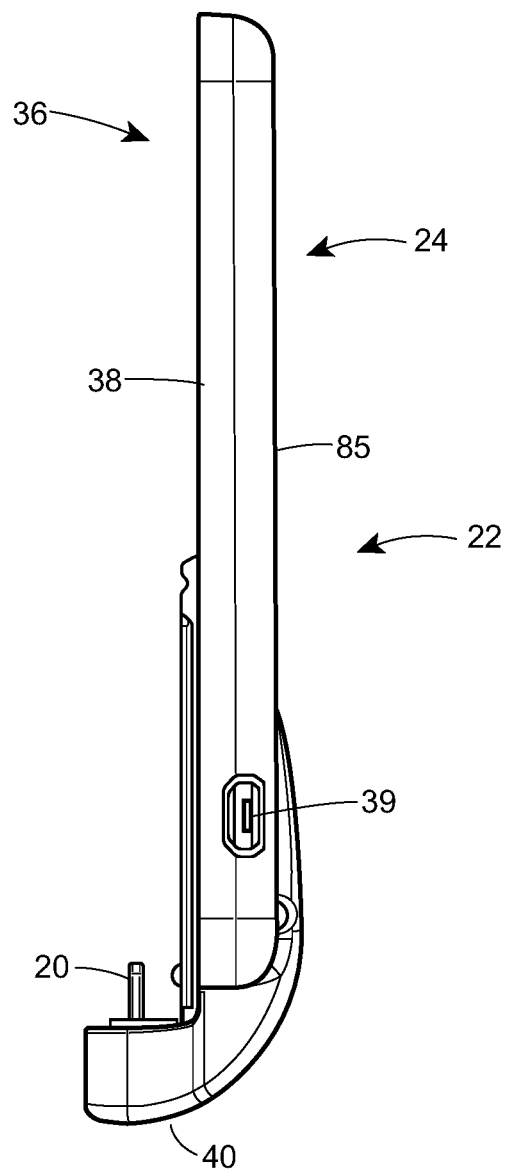
FIG. 6 is a side view of the embodiment of the mounting interface of FIG. 5.
Figure 7:
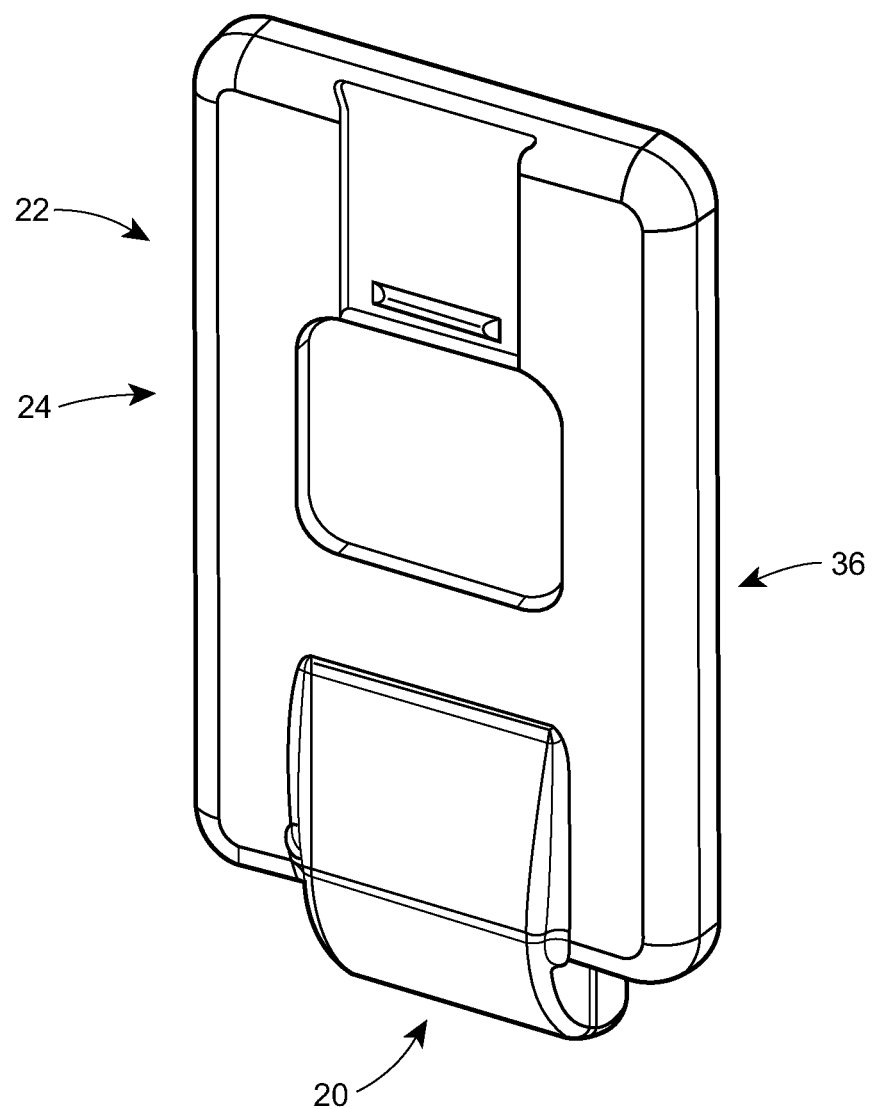
FIG. 7 is a back perspective view of the embodiment of the mounting interface of FIG. 5.

As illustrated in FIG. 6, the support portion 36 may also include (or be electrically coupled to) one or more ports 39 for a standardized electrical plug or connector such as, for example, a USB connector, a mini USB connector, a micro USB connector, an APPLE LIGHTNING® connector, a proprietary electronic connector, and/or an electrical connector of another type. In some embodiments, the one or more ports 39 may be electrically coupled to the rechargeable battery 22, and the one or more ports 39 may be configured to allow a user to charge the rechargeable battery 22 using an external charging device, such as a personal computer or a charging adapter. In other embodiments, the one or more ports 39 may be electrically connected do the rechargeable battery 22 but not coupled to the support portion 36. The one or more ports 39 may be electrically coupled to the rechargeable battery 22 by the circuitry 32 (or a portion of the circuitry 32), such as by one or more wires 41.

Figure 5:
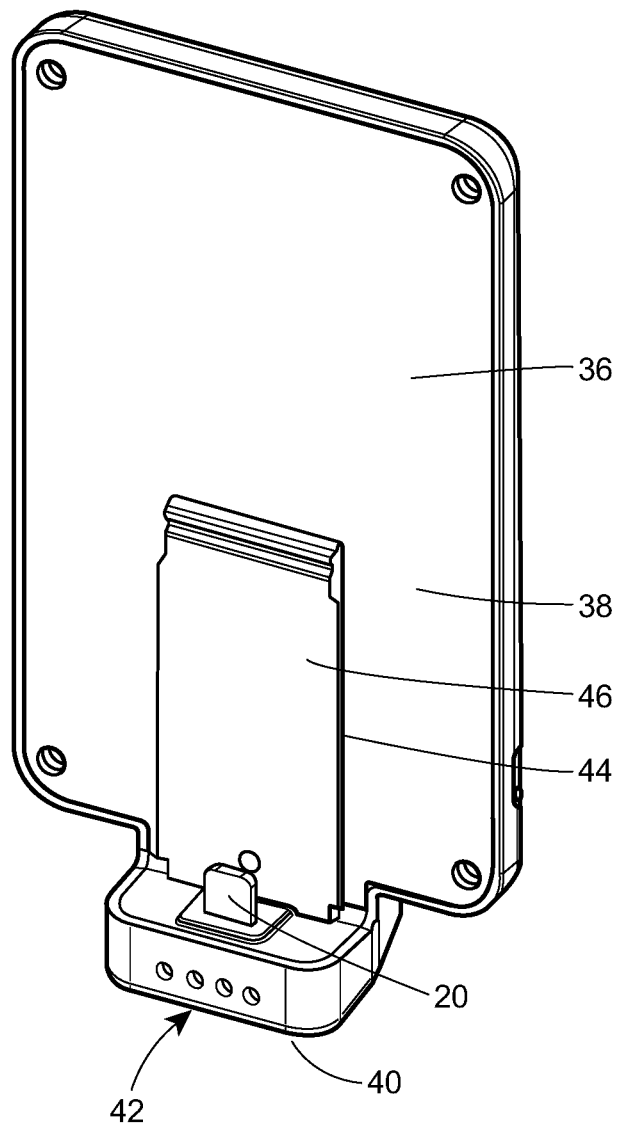
FIG. 5 is a front perspective view of an embodiment of a mounting interface of an embodiment of a charging assembly.

With reference to FIG. 5, the mounting interface 24 may also include a connection portion 40 coupled to the support portion 36. The connection portion 40 may be disposed at or adjacent to an end of the support portion 36, and the electrical connection 20 may be disposed on the connection portion 40. The connection portion 40 may extend or project from the top surface 38 such that when the portable electronic device 12 (with or without the protective case 16) is disposed on or coupled to the support portion 36, the electrical connector 20 is positioned and configured to align (and mate) with the electrical interface 14 of the portable electronic device 12. At least one indicator 42 may be disposed on or coupled to the connection portion 40, and the least one indicator 42 may include at least one LED or other optical indicator. The indicator 42 may provide a visual indication that the electrical connector 20 of the charging assembly 18 is coupled to the electrical interface 14 of the portable electronic device 12. In addition, or alternatively, the indicator 42 may provide a visual indication of the level of stored electrical power in the rechargeable battery 22.

The mounting interface 24 may also include one or more engagement features 44 that removably couple and/or secure the protective case 16 and the portable electronic device 12 (or just the portable electronic device 12 without the protective case 16) to the support portion 36. The one or more engagement features 44 may be any features or combination of features that removably couple the protective case 16 and/or the portable electronic device 12 to the support portion 36 and/or the connector portion 40 such that the electrical connector 20 is coupled to the electrical interface 14 of the portable electronic device 12. As illustrated in FIG. 5, the one or more engagement features 44 may include a planar tab 46 that is adapted to be removably received into a recess 48 formed in the protective case 16 (see FIG. 4). The tab 46 may be slidingly received into the recess 48 to secure the tab 46 within the recess 48 and thereby removably secure the protective case 16 to the mounting interface 24. The tab 46 and recess 48 are described in more detail in U.S. patent application Ser. No. 15/062,399, which is incorporated herein by reference. In other embodiments (not shown), the one or more engagement features 44 may include arms or walls that extend from the support portion 36 to removably secure a portion of the protective case 16 and/or the portable electronic device 12 to the support portion 36. In still other embodiments, the one or more engagement features 44 may include straps or bands, or magnetic couplings to removably secure the protective case 16 and/or the portable electronic device 12 to the support portion 36.

The charging assembly 18 also includes the solar panel 26 that is electrically coupled to the rechargeable battery 22, and the solar panel 26 is configured to receive ambient light and convert the ambient light to received electrical power. The solar panel 26 may be comprised of one or more solar cells (also known as photovoltaic cells), and the one or more solar cells may be any device that converts the energy in ambient light to electricity. The solar panel 26 (or each solar panel 26, if more than one solar panel 26 is used) may be directly or indirectly electrically coupled to the rechargeable battery 22 in any suitable manner. For example, the solar panel 26 may be electrically coupled to the rechargeable battery 22 by the circuitry 32 (or a portion of the circuitry 32), which may include one or more wires 45.

Figure 8:
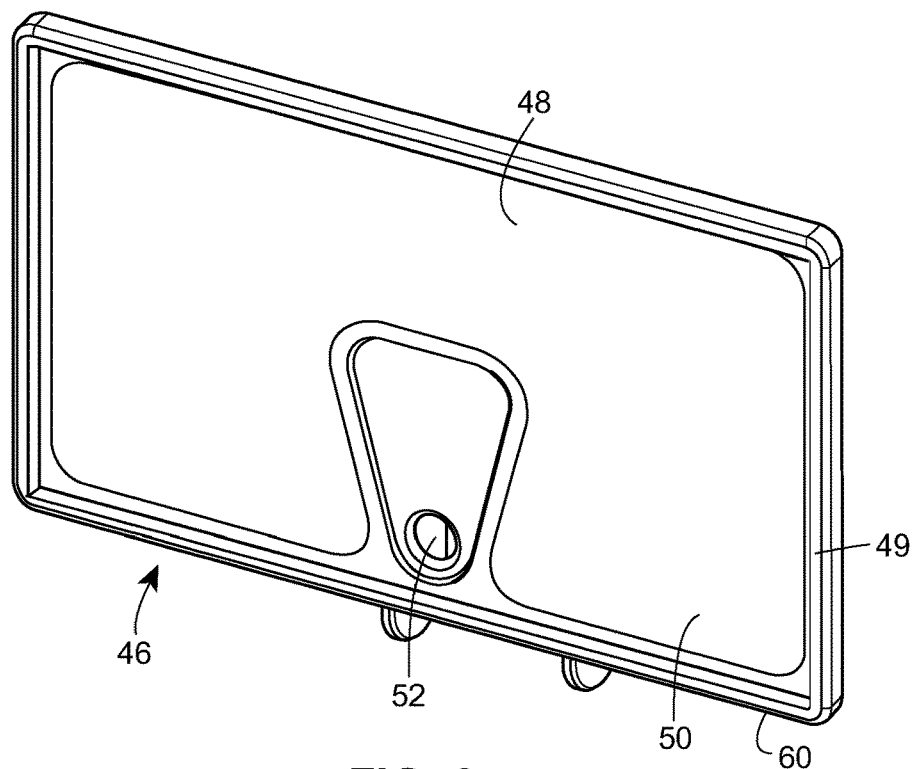
FIG. 8 is a front perspective view of an embodiment of a solar panel mounting member without an attached solar panel.
Figure 9:
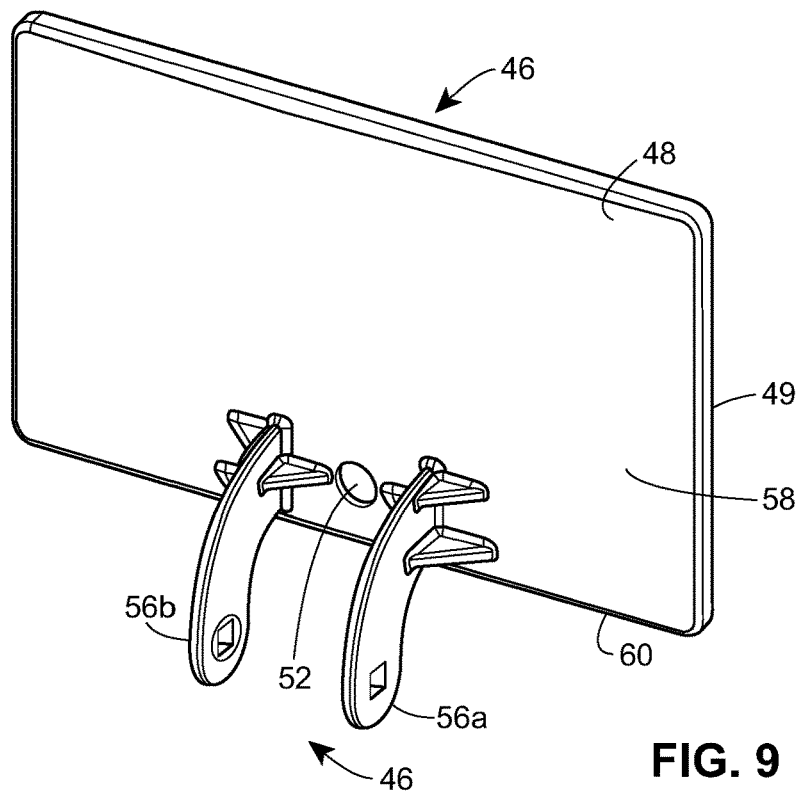
FIG. 9 is a back perspective view of the embodiment of the solar panel mounting member of FIG. 8.

The solar panel 26 may be at least partially supported by a solar panel mounting member 46 that may be displaceable relative to the mounting interface 24 and/or the rechargeable battery 22. As illustrated in FIG. 8, the solar panel mounting member 46 may have a mounting portion 48 that may have any suitable shape to accommodate the one or more solar panels 26 (not shown in FIG. 8). That is, the mounting portion 48 may have a perimeter edge 49 that may surround (e.g., entirely surround) the one or more solar panel 26 to provide perimeter protection to the solar panel 26 against impacts. In some embodiments, the mounting portion 48 may be planar and the perimeter edge 49 may have a rectangular or substantially rectangular shape. One or more solar panel 26 may be mounted to a front surface 50 of the mounting portion 48, and the wires 45 that couple each (or any) of the solar panel 26 may extend through an aperture 52 in the mounting portion 48 to the rechargeable battery 22. The one or more solar panel 26 may be mounted to the front surface 50 in any suitable manner, such as, for example, by mechanical fasteners, an adhesive, or snap features The mounting portion 48 may be displaceably coupled to a base portion 54, as illustrated in FIG. 2. In some embodiments, the mounting portion 48 may be pivotably coupled to the base portion 54. More specifically, as illustrated in FIG. 9, one or more mounting arms 56 (such as a first mounting arm 56a and a second mounting arm 56b) may extend from a back surface 58 of the mounting portion 48. Each of the one or more mounting arms 56 may be planar and extend in a plane normal to the plane of the front surface 50 and/or back surface 58 of the mounting portion 48. A first end of each of the one or more mounting arms 56 may extend from a portion of the back surface 58 that is adjacent to a bottom edge 60 of the perimeter edge 49 to a second point below and beyond the bottom edge 60 of the mounting portion 48. The aperture 52 may be disposed between the first ends of the first and second mounting arms 56a, 56b, as illustrated in FIG. 9. The first end of each of the one or more mounting arms 56 may extend towards the second end along any suitable shape, such as an arc shape or the shape of a segment of a circle or oval.

Figure 10:
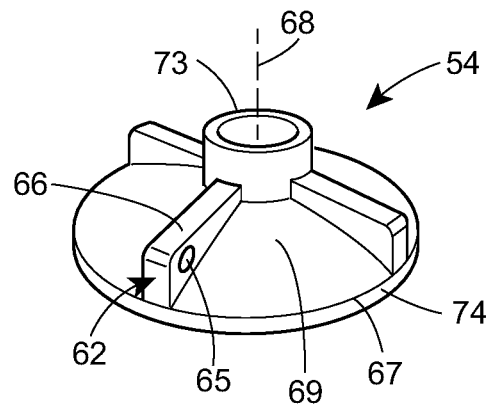
FIG. 10 is a perspective view of an embodiment of a base portion.
Figure 11:
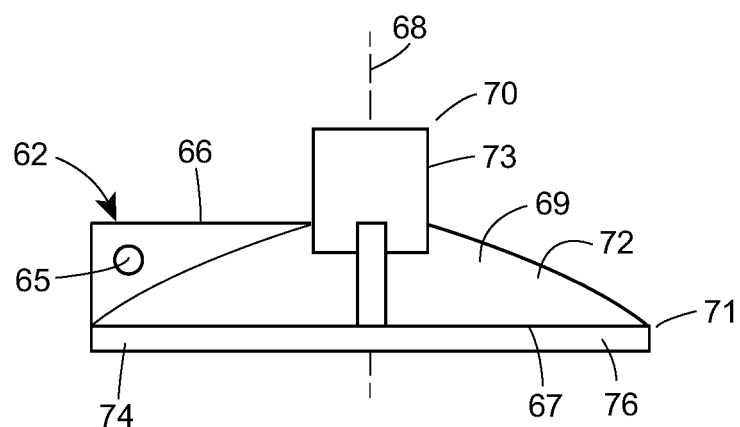
FIG. 11 is a side view of the embodiment of the base portion of FIG. 10.
Figure 12:
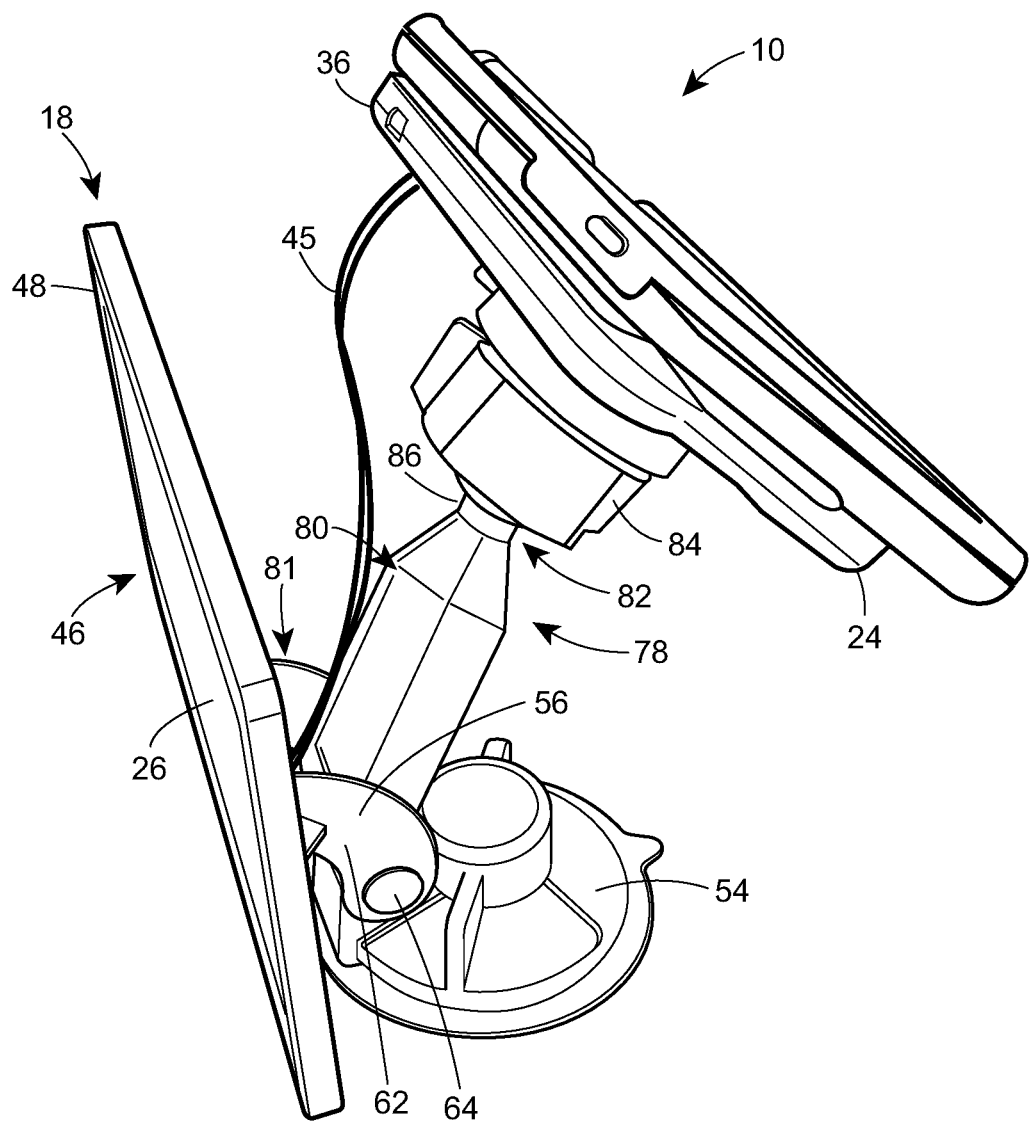
FIG. 12 is a perspective view of an embodiment of a solar charging system.
Figure 13:
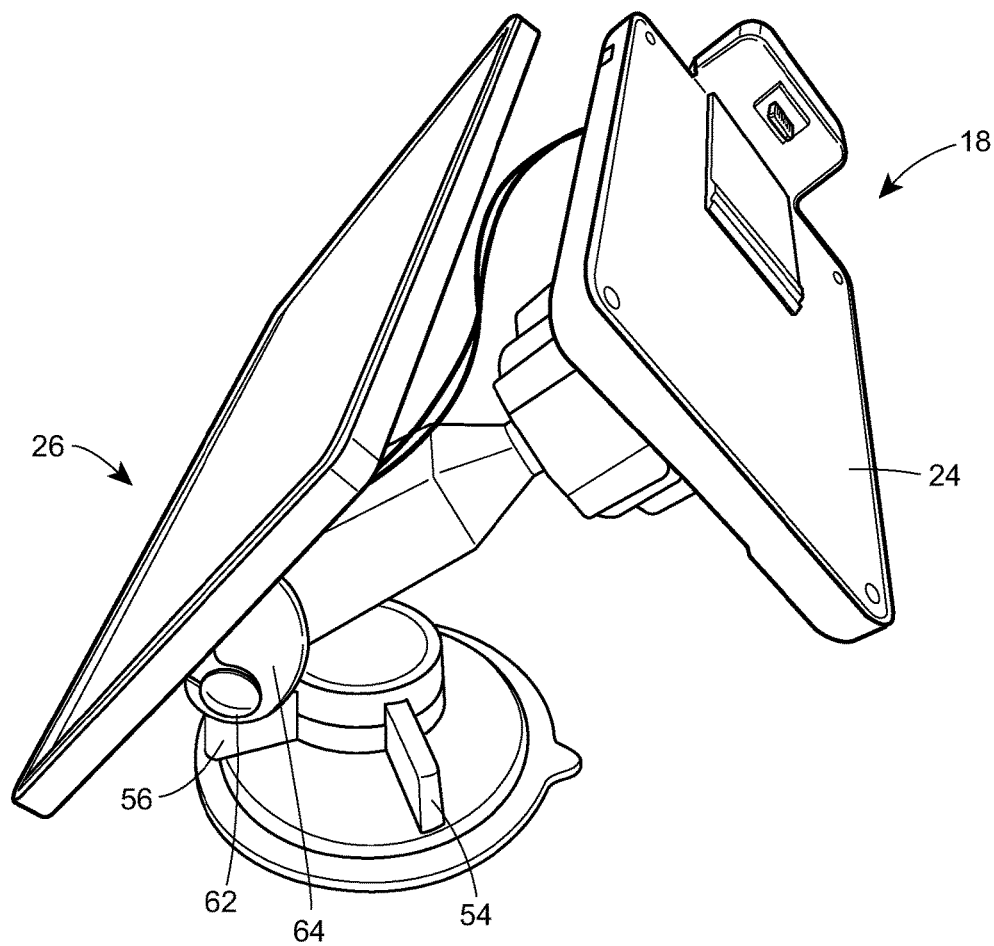
FIG. 13 is a perspective view of an embodiment of a charging assembly of an embodiment of a solar charging system.
Figure 14:
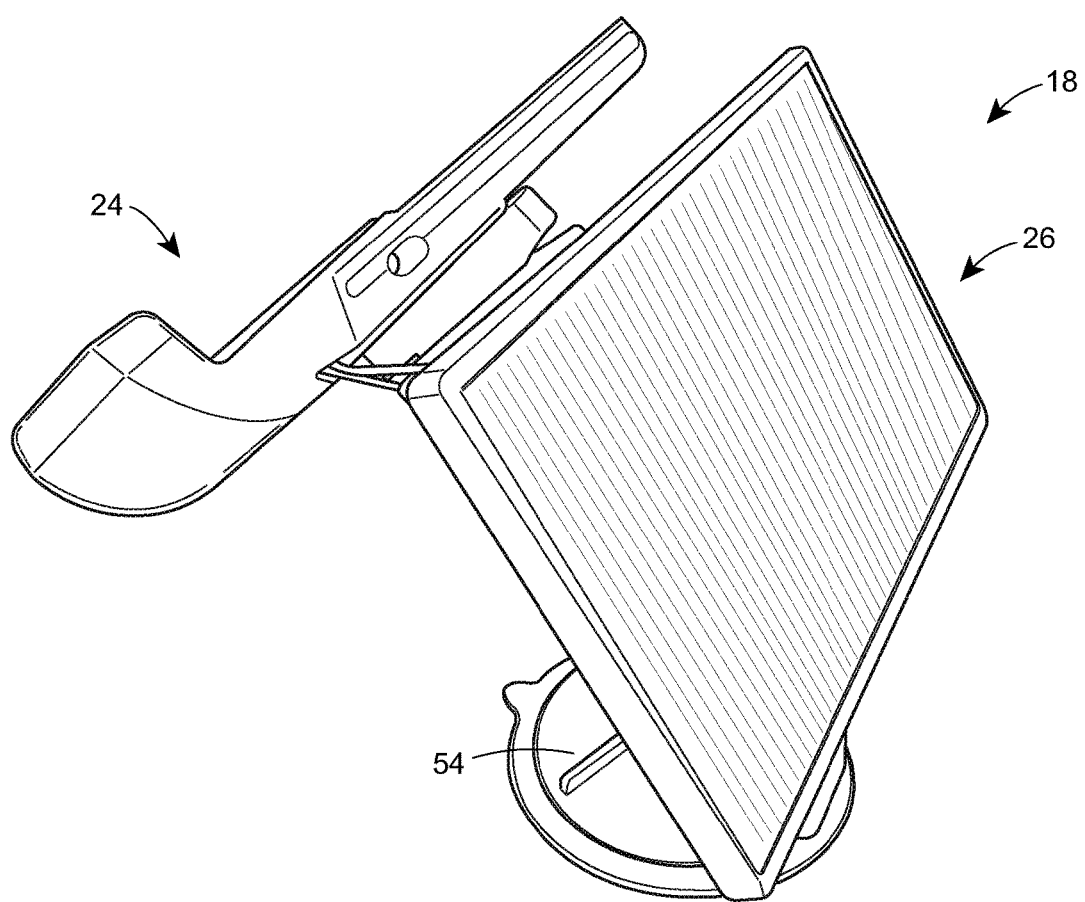
FIG. 14 is a perspective view of an embodiment of a charging assembly of an embodiment of a solar charging system.
Figure 15:
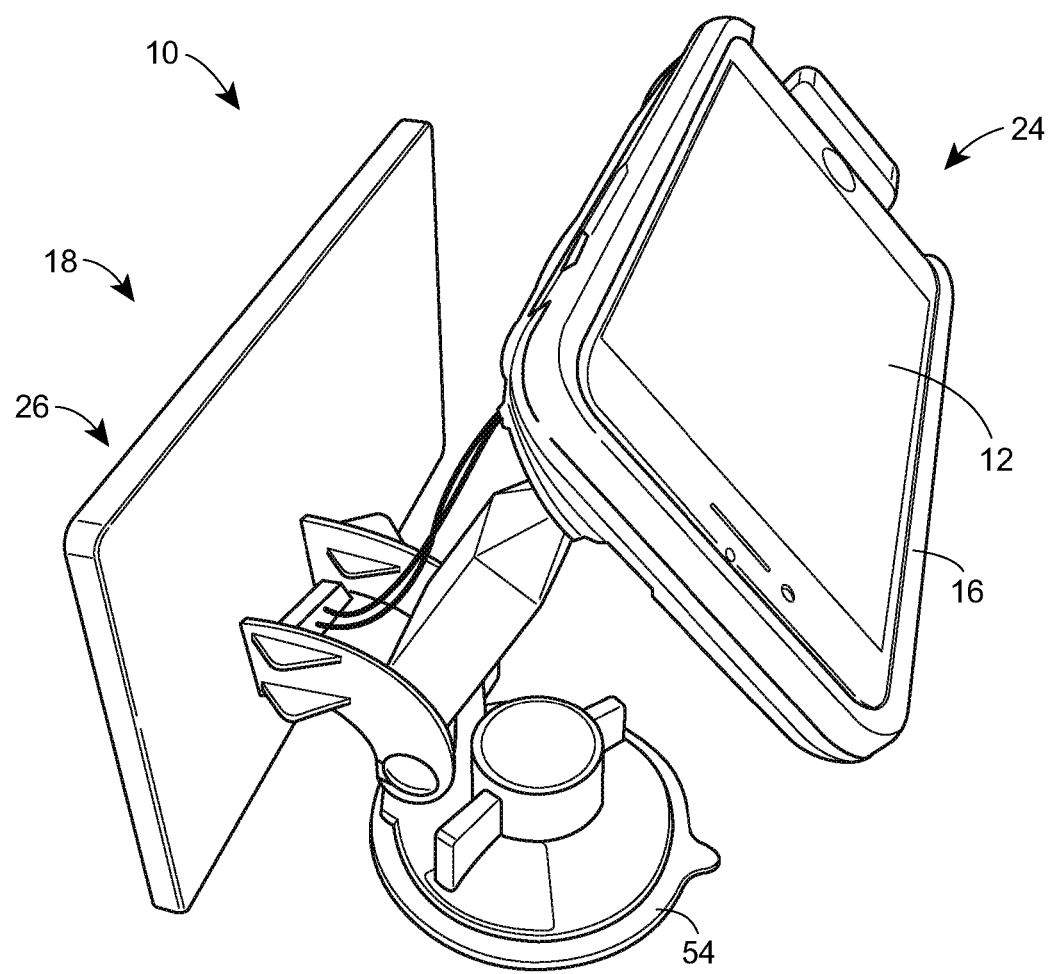
FIG. 15 is a perspective view of an embodiment of a solar charging system.

As illustrated in FIGS. 12 and 13, the second end of the one or more mounting arms 56 may be coupled (e.g., rotatably coupled or slidably coupled) to a portion 62 of the base portion 54 to allow the solar panel mounting member 46 to displace (e.g., pivot about and/or slide relative to) the portion of the base portion 54. For example, one or more pins 64 may be disposed through an aperture formed in the second end of each of the first and second mounting arms 56a, 56b. The pin 64 may also extend through an aperture 65 (illustrated in FIGS. 10 and 11) extending through a support feature 66 (e.g., a first raised feature) of the base portion 54. So configured, with the support feature 66 disposed between the first and second mounting arms 56a, 56b, the mounting portion 48 (and the solar panel(s) attached thereto) pivots about an axis extending along/through the aperture 65 through the support feature 66. The one or more pins 64 may snugly fit within the aperture formed in the second end of each of the first and second mounting arms 56a, 56b and/or the aperture 65 through the support feature 66 such that friction maintains the mounting portion 48 in a desired position relative to the base portion 54. In other embodiments, the second end of the one or more mounting arms 56 (or any portion of the mounting portion 48) may be fixed to the portion 62 of the base portion 54 such that the solar panel 26 is not displaceable relative to the base portion 54.

As illustrated in FIG. 11, the base portion 54 may extend along a base axis 68 from a first end 70 to a second end 71, and the pivot axis extending along/through the aperture 65 through the support feature 66 may be normal to the base axis 68. A base body 69 may extend along the base axis 68, and the base body 69 may have the shape of an inverted bowl or cup. A top protrusion 73 may upwardly extend from the from a top surface 72 of the base body 69 along the base axis 68, and a top portion of the top protrusion 73 may be disposed at the first end 70 of the base portion 54. A bottom edge 67 of the base body 69 may be disposed adjacent to the second end 71 of the base portion 54. The support feature 66 may upwardly extend from the top surface 72 of the base body 69, and the support feature 66 may be a raised rib that extends from a point adjacent to the base axis 68 to a point adjacent to the bottom edge 67 of the base body 69. In some embodiments, the support feature 66 may be a protrusion that upwardly extends from the top surface 72 of the base body 69.

As illustrated in FIGS. 12 and 13, the mounting interface 24 may also be coupled (e.g., movably coupled) to the base portion 54 such that the mounting interface 24 can displace relative to the base portion 54 and/or the solar panel(s) 26. With reference to FIG. 12, the mounting interface 24 may be coupled to the base portion 54 by a mounting assembly 78, and the mounting assembly 78 may include an elongated support arm 80 that extends from a first end 81 to a second end 82. The first end 81 of the support arm 80 may be pivotably connected to a portion of the base portion 54 to allow the support arm 80 to pivot relative to the portion of the base portion 54. In some embodiments, the pin or pins 64 that secure the mounting arms 56a, 56b of the mounting portion 48 of the solar panel mounting member 46 to the support feature 66 of the base portion 54 may also extend through apertures (not shown) in the first end 81 of the support arm 80 to allow the support arm 80 to pivot about the axis extending along/through the aperture 65 through the support feature 66 (see FIG. 11). The second end 82 of the support arm 80 may be coupled directly to the mounting interface 24 (e.g., the support portion 36) and/or the rechargeable battery 22 or to an adapter member 84 coupled to the mounting interface 24 (e.g., the support portion 36) and/or the rechargeable battery 22. In some embodiments, the adapter member 84 may be coupled to a rear surface 85 of the support portion 36 (see FIGS. 6 and 7). The second end 82 of the support arm 80 may be coupled to the adapter member 84 in any manner that allows for relative displacement (e.g., rotation) between the adapter member 84 and the second end 82 of the support arm 80. In some embodiments, the second end 82 of the support arm 80 may be coupled to the adapter member 84 by a ball and socket joint 86, as illustrated in FIG. 12. For example, the second end 82 of the support arm 80 may include a ball or spherical-shaped element that is received into a spherical or partially-spherical cavity in the adapter member 84.

Referring to FIG. 2, a securement feature 74 may be coupled to or integrally formed with a portion of (e.g., the base body 69) of the base portion 54, and the securement feature 74 may attach (e.g., removably attach) the base portion 54 (and the entire charging assembly 18) to a surface 75 of a vehicle. The surface 75 may be any suitable portion of the vehicle, such as an inner surface of a windshield or a portion of the vehicle's dashboard. In the embodiment of the base portion 54 illustrated in FIG. 2, the securement feature 74 is a suction cup 76 secured to a portion of the base body 69, and the suction cup 76 may have a lower portion that extends beyond the bottom edge 67 of the base body 69. The suction cup 76 may be rotatably coupled to the base body 69 to allow the base body 69 (and the entire charging assembly 18) to rotate about the base axis 68 relative to the suction cup 76. In other embodiments, the suction cup 76 may be fixed to the base body 69, and rotating the charging assembly 18 involves detaching the suction cup 76 from the surface 75 and reattaching the suction cup 76 to the surface 75 at a new rotational orientation or location. The suction cup 76 may be secured to the surface 75 by a twisting/cam mechanism that mechanically evacuates air from the space between the suction cup 76 and the surface 75, thereby creating a vacuum between the suction cup 76 and the surface 75. In other embodiments, the securement feature 74 is a first portion of a hook-and-loop material (e.g., VELCRO®) that is disposed at or adjacent to the second end 71 of the base portion 54. The first portion of the hook-and-loop material may be removably secured to a second portion of a hook-and-loop material that is secured to the surface 75 (e.g., by an adhesive).

Configured as described, the solar charging system 10 may be disposed at a desired location in a vehicle to allow the solar panel(s) 26 to store charge in the rechargeable battery 22 when a portable electronic device 12 is not electrically coupled to the rechargeable battery 22. Thus, the solar panel(s) 26 may charge the rechargeable battery 22 during daylight hours to maintain a full charge in the rechargeable battery 22. Such a fully charged battery 22 increases the charge rate of the portable electronic device 12 relative to a solar panel 26 alone and/or relative to a partially-charged rechargeable battery alone. Moreover, because the rechargeable battery 22 is charged by ambient light and not a feature of the vehicle, the rechargeable battery 22 can be charged when the vehicle is not being operated.

When it is desired to use the portable electronic device 12 (to use a navigation application, for example) the protective case 16 is mounted to the mounting interface 24 and/or the electrical connector 20 is electrically coupled to the electrical interface 14 of the installed portable electronic device 12 such that the stored electrical power (or a portion of the stored electrical power) is transferred, provided, or conveyed to the portable electronic device 12 to provide power to the portable electronic device 12 and/or to charge the internal battery of the portable electronic device 12. Accordingly, the portable electronic device 12 may be electrically connected or coupled to the rechargeable battery 22 to provide power when no or little ambient light is available. In addition, no wires extend from the portable electronic device 12 to a feature of the dashboard (e.g., a lighter adapter), as is common with conventional charging assemblies, thereby eliminating a potential distraction for the driver of a vehicle.

In some embodiments of the charging system 10, when the electrical connector 20 is electrically coupled to the electrical interface 14 of the installed portable electronic device 12, and when a charging level of the internal battery of the portable electronic device 12 is below a threshold stored charge, stored electrical power is transferred, provided, or conveyed from the rechargeable battery 22 to the portable electronic device 12. In still other embodiments of the charging system 10, received electrical power may be stored in the rechargeable battery 22 as stored electrical power when the electrical connector 20 is electrically coupled to the electrical interface 14 of the portable electronic device 12 and when the internal battery of the portable electronic device 12 has reached a charging level that is equal to or greater than the threshold stored charge of the internal battery of the portable electronic device, in some embodiment. The threshold stored charge may be any suitable maximum charging level in the internal battery of the portable electronic device 12, such as 80% charged, 90% charged, 100% charged, or any value between 80% charged and 100% charged.

Moreover, during use, the one or more solar panels 26 may be independently displaceable relative to the base portion 54, the rechargeable battery 22, and/or the mounting interface 24 to optimally position the one or more solar panels 26 normal to received ambient light. Furthermore, the mounting interface 24 may be independently displaceable relative to the base portion 54 to position the portable electronic device 12 in a desired location to optimize viewing or access by a user.

The solar charging system 10 and/or the charging system 18 may be assembled or manufactured in any suitable manner. For example, as illustrated in FIG. 1, the rechargeable battery 22 may be the electrically coupled to the electrical connector 22 in any suitable manner by a manufacturer, such as by circuitry 32 (or a portion of the circuitry 32), which may include one or more wires 34. The solar panel 26 may be electrically coupled to the rechargeable battery 22 in any suitable manner by a manufacturer, such as by the circuitry 32 (or a portion of the circuitry 32), which may include one or more wires 45. In addition, a manufacturer may couple the solar panel 26 to the base portion 54 in any suitable manner such that the solar panel 26 is displaceable relative to the base portion 54. Further, a manufacturer may couple the mounting interface 24 to the base portion 54 in any suitable manner such that the mounting interface 24 may displace relative to the base portion 54.

FIG. 1 also illustrates an embodiment of a system 96 for selectively charging the portable electronic device 12 that includes the electrical interface 14, and the system 96 includes the solar panel 26, the rechargeable battery 22, and the electrical connector 20 electrically coupled to the solar panel 26 and the rechargeable battery 22. The system 96 further includes the computing device 90 including the memory 92 and the processor 94, and the computing device 90 may be coupled to or integrated with any portion(s) of the charging assembly 18, such as the solar panel 26 and/or the rechargeable battery 22. For example, the computing device 90 may be coupled to the rechargeable battery 22 (e.g., may be coupled to or be disposed on a portion of the mounting interface 24) by the circuitry 32 (or a portion of the circuitry 32), which may include one or more wires 98.

Logic may be stored on the memory 92 and executable by the processor 94 for determining whether the electrical connector 20 is coupled to the electrical interface 14 of the portable electronic device 12. If the electrical connector 20 is coupled to the electrical interface 14 of the portable electronic device 12, then a stored electrical power (or a portion of the stored electrical power) is transferred from the rechargeable battery 22 to the portable electronic device 12. If the electrical connector 20 is not coupled to the electrical interface 14 of the portable electronic device 12, received electrical power from the solar panel 26 is stored as the stored electrical power (or a portion of the stored electrical power) in the rechargeable battery 22.

Logic may also be stored on the memory 92 and executable by the processor 94 for determining the charging level of the internal battery of the portable electronic device 12 when the electrical connector 20 is coupled to the electrical interface 14 of the portable electronic device 12. If the internal battery of the portable electronic device 12 has a charging level that is less than a threshold stored charge, the stored electrical power (or at least a portion of the stored electrical power) is transferred from the rechargeable battery 22 to the portable electronic device 12. If the battery of the portable electronic 12 device has a charging level that is greater than or equal to the threshold stored charge, the transfer of the stored electrical power (or at least a portion of the stored electrical power) from the rechargeable battery 22 to the portable electronic device is terminated, and the received electrical power from the solar panel is stored as the stored electrical power (or a portion of the stored electrical power) in the rechargeable battery 22. The threshold stored charge may be any suitable maximum charging level in the internal battery of the portable electronic device 12, such as 80% charged, 90% charged, 100% charged, or any value between 80% charged and 100% charged.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A solar charging system for a portable electronic device including an electrical interface, the solar charging system comprising:
    a protective case for receiving and partially enclosing the portable electronic device when the portable electronic device is installed in the protective case; and
    a charging assembly including:
        an electrical connector adapted to be removably coupled to the electrical interface of the portable electronic device such that when the electrical connector is coupled to the electrical interface of the portable electronic device, the electrical connector is electrically coupled to the electrical interface of the portable electronic device;
        a rechargeable battery electrically coupled to the electrical connector, the rechargeable battery adapted to store a stored electrical power;
        a base portion;
        a mounting interface including an elongated support arm coupled to the base portion, the mounting interface adapted to removably support the protective case, the mounting interface and the protective case configured such that the electrical connector electrically coupled to the rechargeable battery engages the electrical interface of the installed portable electronic device when the portable electronic device is installed in the protective case and the protective case is mounted to the mounting interface;
        a solar panel mounting member pivotably coupled to the base portion by a first mounting arm and a second mounting arm each extending from a first end adjacent to a bottom edge on a back surface of the solar panel mounting member to a second end below and beyond the bottom edge;
        a pin securing the first mounting arm and the second mounting arm to the base portion, the pin pivotably connecting the elongated support arm to the base portion, the pin extending through the second end of the first mounting arm, the second end of the second mounting arm, a first aperture extending through a support feature of the base portion, and a second aperture extending through a first end of the elongated support arm of the mounting interface; and
        a solar panel coupled to a front surface of the solar panel mounting member and configured for receiving ambient light and converting the ambient light to received electrical power, wherein the solar panel is electrically coupled to the rechargeable battery such that received electrical power can be stored in the rechargeable battery as the stored electrical power, the solar panel being independently displaceable relative to the base portion and the mounting interface;
        wherein when the protective case is mounted to the mounting interface, the electrical connector is electrically coupled to the electrical interface of the installed portable electronic device such that at least a portion of the stored electrical power can be provided to the portable electronic device, and
        wherein when the protective case is not mounted to the mounting interface, received electrical power can be stored in the rechargeable battery as the stored electrical power.

2. The solar charging system of claim 1, wherein when the protective case is mounted to the mounting interface and when an internal battery of the portable electronic device is fully charged, received electrical power is stored in the rechargeable battery as the stored electrical power.

3. The solar charging system of claim 1, wherein a securement feature is coupled to or integrally formed with a portion of the base portion, and the securement feature is adapted to attach the base portion to a surface of a vehicle.

4. The solar charging system of claim 3, wherein the securement feature includes a suction cup.

5. The solar charging system of claim 1, wherein the mounting interface includes one or more engagement features that removably couple the protective case and the portable electronic device to a support portion of the mounting interface.

6. The solar charging system of claim 5, wherein the one or more engagement features includes a planar tab adapted to be slidingly received into a recess formed in the protective case to removably secure the protective case to the mounting interface.

7. The solar charging system of claim 1, wherein the mounting interface is independently displaceable relative to the base portion.

8. The solar charging system of claim 1, wherein the solar panel is independently displaceable relative to the rechargeable battery and the base portion.

9. The solar charging system of claim 1, wherein the solar panel is electrically coupled to the rechargeable battery by a wire passing through an aperture in the solar panel mounting member disposed between the first mounting arm and the second mounting arm.

10. A charging assembly for a portable electronic device including an electrical interface, the charging assembly comprising:
   an electrical connector adapted to be removably coupled to the electrical interface of the portable electronic device such that when the electrical connector is coupled to the electrical interface of the portable electronic device, the electrical connector is electrically coupled to the electrical interface of the portable electronic device;
   a rechargeable battery electrically coupled to the electrical connector, the rechargeable battery adapted to store a stored electrical power;
   a base portion;
   a mounting interface coupled to the base portion and adapted to removably support the portable electronic device, the mounting interface and the portable electronic device configured such that the electrical connector electrically coupled to the rechargeable battery engages the electrical interface of the installed portable electronic device when the portable electronic device is mounted to the mounting interface; and
   a solar panel coupled to the base portion and configured for receiving ambient light and converting the ambient light to received electrical power, wherein the solar panel is electrically coupled to the rechargeable battery such that received electrical power is configured to be stored in the rechargeable battery as the stored electrical power, the solar panel being independently displaceable relative to the base portion and the mounting interface;
   wherein the solar panel is coupled to the base portion with a first mounting arm and a second mounting arm, wherein a pin secures the first mounting arm and the second mounting arm to the base portion, the pin extending through the first mounting arm, the second mounting arm, a first aperture extending through a support feature of the base portion, and a second aperture extending through an elongated support arm of the mounting interface;
   wherein when the portable electronic device is mounted to the mounting interface, the electrical connector is electrically coupled to the electrical interface of the installed portable electronic device such that at least a portion of the stored electrical power is provided to the portable electronic device, and
   wherein when the portable electronic device is not mounted to the mounting interface, received electrical power is stored in the rechargeable battery as the stored electrical power.

11. The charging assembly of claim 10, wherein when the portable electronic device is mounted to the mounting interface and when an internal battery of the portable electronic device is fully charged, the received electrical power is stored in the rechargeable battery as the stored electrical power.

12. The charging assembly of claim 10, wherein the solar panel is coupled to a solar panel mounting member, and the solar panel mounting member is pivotably coupled to the base portion.

13. The charging assembly of claim 10, wherein a securement feature is coupled to or integrally formed with a portion of the base portion, and the securement feature is adapted to attach the base portion to a surface of a vehicle.

14. The charging assembly of claim 13, wherein the securement feature is a suction cup.

15. A method of assembling a charging system to provide power to a portable electronic device that includes an electrical interface, the method comprising:
   electrically coupling a rechargeable battery to an electrical connector, the electrical connector adapted to be removably coupled to the electrical interface of the portable electronic device such that when the electrical connector is coupled to the electrical interface of the portable electronic device, the electrical connector is electrically coupled to the electrical interface of the portable electronic device, wherein the rechargeable battery is adapted to store a stored electrical power;
   electrically coupling a solar panel to the rechargeable battery, the solar panel configured for receiving ambient light and converting the ambient light to received electrical power, wherein the solar panel is electrically coupled to the rechargeable battery such that the received electrical power is configured to be stored in the rechargeable battery as at least a portion of the stored electrical power, wherein when the portable electronic device is mounted to a mounting interface, the electrical connector is electrically coupled to the electrical interface of the installed portable electronic device such that stored electrical power is provided to the portable electronic device, and when the portable electronic device is not mounted to the mounting interface, the received electrical power is stored in the rechargeable battery as at least a portion of the stored electrical power; and
   coupling the solar panel to a base portion such that the solar panel is independently displaceable relative to the base portion and the mounting interface, wherein the base portion is adapted to be secured to a surface of a vehicle, wherein the solar panel is coupled to the base portion with a first mounting arm and a second mounting arm, wherein a pin secures the first mounting arm and the second mounting arm to the base portion, the pin extending through the first mounting arm, the second mounting arm, a first aperture extending through a support feature of the base portion, and a second aperture extending through an elongated support arm of the mounting interface.

16. The method of claim 15, further comprising: coupling the mounting interface to the base portion such that the mounting interface is displaceable relative to the base portion, wherein the mounting interface is adapted to support the portable electronic device when the electrical connector is coupled to the electrical interface of the portable electronic device.

17. A system for selectively charging a portable electronic device that includes an electrical interface, the system comprising:
a solar panel;
a rechargeable battery;
an electrical connector electrically coupled to the solar panel and the rechargeable battery;
a mounting interface adapted to removably mount the portable electronic device, the mounting interface configured such that the electrical connector is electrically coupled to the electrical interface of the portable electronic device when the portable electronic device is mounted to the mounting interface;
a base portion coupled to the solar panel and the mounting interface, the solar panel being independently displaceable relative to the base portion and the mounting interface, and the mounting interface being independently displaceable relative to the base portion and the solar panel, wherein the solar panel is coupled to the base portion with a first mounting arm and a second mounting arm, wherein a pin secures the first mounting arm and the second mounting arm to the base portion, the pin extending through the first mounting arm, the second mounting arm, a first aperture extending through a support feature of the base portion, and a second aperture extending through an elongated support arm of the mounting interface; and
a computing device including a memory and a processor, with logic stored on the memory and executable by the processor for:
determining whether the electrical connector is coupled to the electrical interface of the portable electronic device;
if the electrical connector is coupled to the electrical interface of the portable electronic device, transferring at least a portion of a stored electrical power from the rechargeable battery to the portable electronic device; and
if the electrical connector is not coupled to the electrical interface of the portable electronic device, storing a received electrical power from the solar panel as at least a portion of the stored electrical power in the rechargeable battery.

18. The system of claim 17, wherein the computing device further comprises logic stored on the memory and executable by the processor for:
determining a charging level of an internal battery of the portable electronic device when the electrical connector is coupled to the electrical interface of the portable electronic device;
if the internal battery of the portable electronic device has a charging level that is less than a threshold stored charge, transferring at least a portion of the stored electrical power from the rechargeable battery to the portable electronic device; and
if the internal battery of the portable electronic device has a charging level that is greater than or equal to the threshold stored charge, terminating the transfer of the stored electrical power from the rechargeable battery to the portable electronic device and storing the received electrical power from the solar panel as at least a portion of the stored electrical power in the rechargeable battery.

* * * * *